United States Patent [19]

Coles

[11] Patent Number: 5,784,409
[45] Date of Patent: Jul. 21, 1998

[54] ENCODING DATA

[75] Inventor: Alistair Neil Coles, Bath, England

[73] Assignee: Hewlett-Packard Company, Palo Alto, Calif.

[21] Appl. No.: 606,262

[22] Filed: Feb. 23, 1996

[30] Foreign Application Priority Data

Mar. 6, 1995 [EP] European Pat. Off. .............. 95301419

[51] Int. Cl.$^6$ .................................................. H04L 25/49
[52] U.S. Cl. ............................ 375/286; 375/292; 341/56
[58] Field of Search ................................. 375/286, 295, 375/288, 293, 292; 341/57, 55

[56] References Cited

U.S. PATENT DOCUMENTS

| | | | |
|---|---|---|---|
| 4,003,041 | 1/1977 | van Duuren et al. . | |
| 4,231,023 | 10/1980 | Warmer | 341/57 |
| 4,757,499 | 7/1988 | Gorshe . | |
| 4,779,073 | 10/1988 | Iketani | 341/55 |
| 4,972,106 | 11/1990 | Ruijs | 307/473 |
| 5,280,500 | 1/1994 | Mazzola et al. | 375/286 |
| 5,633,631 | 5/1997 | Teckman | 341/58 |
| 5,633,892 | 5/1997 | Krisher | 375/286 |

FOREIGN PATENT DOCUMENTS

| | | |
|---|---|---|
| 0596736A1 | 4/1993 | European Pat. Off. . |
| 0596523A2 | 5/1993 | European Pat. Off. . |

OTHER PUBLICATIONS

Electronics Letters, vol. 29, No. 12, 10 Jun. 1993 (pp. 1107–1109) Mobray, M. et al., "New 5B/6T Code for Data Transmission on Unshielded Twisted Pair Cable".

Electronic Letters, vol. 18, No. 24, 25 Nov. 1982, (pp. 1040–1041) Kim & Kim, "New runlength–limited and dc–free line code of minimum bandwidth".

Electronics Letters, vol. 30, No. 16, 4 Aug. 1994 (pp. 1284–1285) "Spectra of a class of run–length limited MLT3 Codes".

*Primary Examiner*—Stephen Chin
*Assistant Examiner*—Kevin Kim

[57] ABSTRACT

Three-level (ternary) line codes are provided for use in transmitting binary data at high data rates (e.g. 100 Mbits/s) over twisted-pair cable, without producing excessive radiated emissions at frequencies above 30 MHz. A running digital sum (RDS) is computed for a stream of ternary symbols as it is encoded; if this RDS reaches a predetermined limit, the polarity of the next following non-zero symbol is determined so as to change the RDS towards zero. In addition, if the binary data stream and the RDS satisfy another predetermined criterion, such as the RDS having a particular polarity when two or more 0 symbols have occurred, then the next non-zero symbol is determined so as to have the opposite polarity; otherwise the next non-zero symbol has the opposite polarity to the preceding non-zero symbol. The RDS limit and the predetermined criterion can be selected to obtain a desired power spectral density for the ternary signal propagating over the twisted-pair cable.

11 Claims, 8 Drawing Sheets

Fig.1
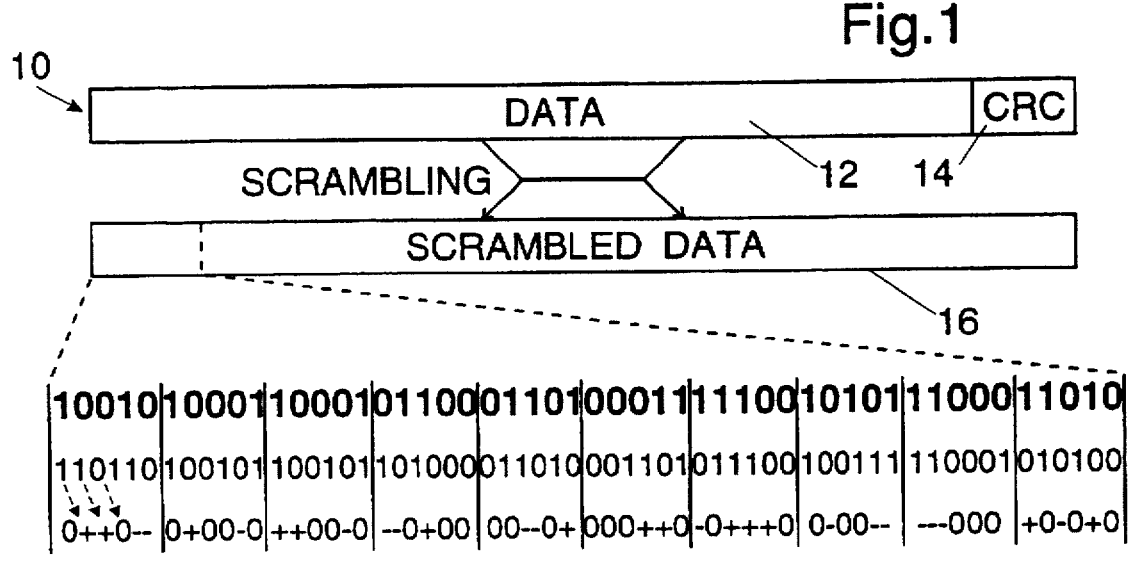
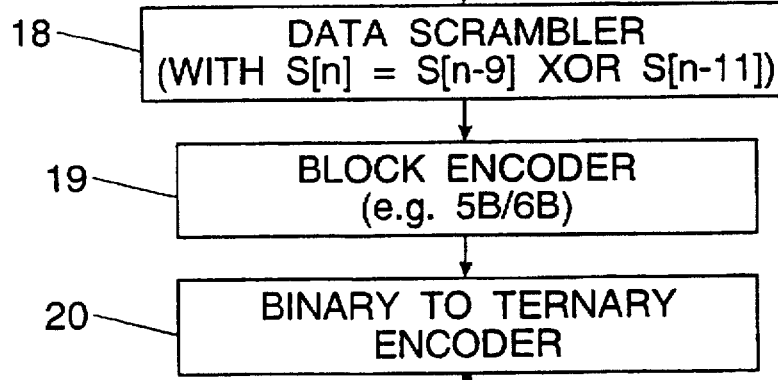
Fig.2
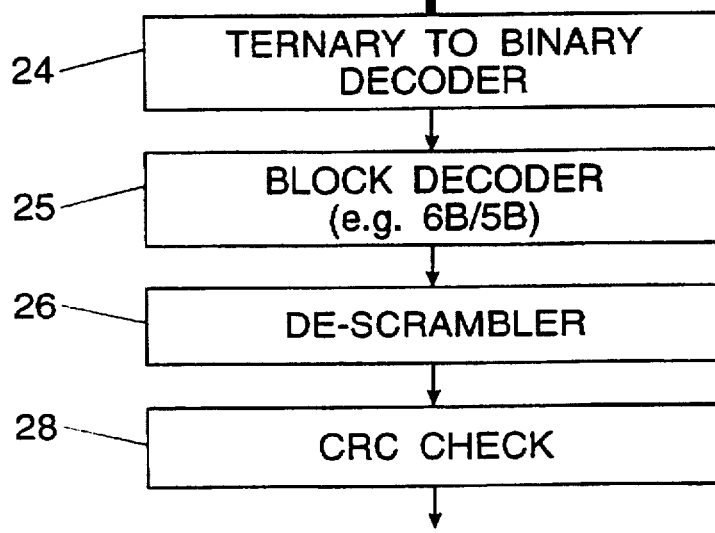

Fig.4

| 5-bit data word | 6-bit code | | |
|---|---|---|---|
| 00000 | 001100 | | 110011 |
| 00001 | | 101100 | |
| 00010 | 100010 | | 101110 |
| 00011 | | 001101 | |
| 00100 | 001010 | | 110101 |
| 00101 | | 010101 | |
| 00110 | | 001110 | |
| 00111 | | 001011 | |
| 01000 | | 000111 | |
| 01001 | | 100011 | |
| 01010 | | 100110 | |
| 01011 | 000110 | | 111001 |
| 01100 | 101000 | | 010111 |
| 01101 | | 011010 | |
| 01110 | 100100 | | 011011 |
| 01111 | | 101001 | |
| 10000 | 000101 | | 111010 |
| 10001 | | 100101 | |
| 10010 | 001001 | | 110110 |
| 10011 | | 010110 | |
| 10100 | | 111000 | |
| 10101 | 011000 | | 100111 |
| 10110 | | 011001 | |
| 10111 | 100001 | | 011110 |
| 11000 | | 110001 | |
| 11001 | | 101010 | |
| 11010 | 010100 | | 101011 |
| 11011 | | 110100 | |
| 11100 | | 011100 | |
| 11101 | | 010011 | |
| 11110 | 010010 | | 101101 |
| 11111 | | 110010 | |

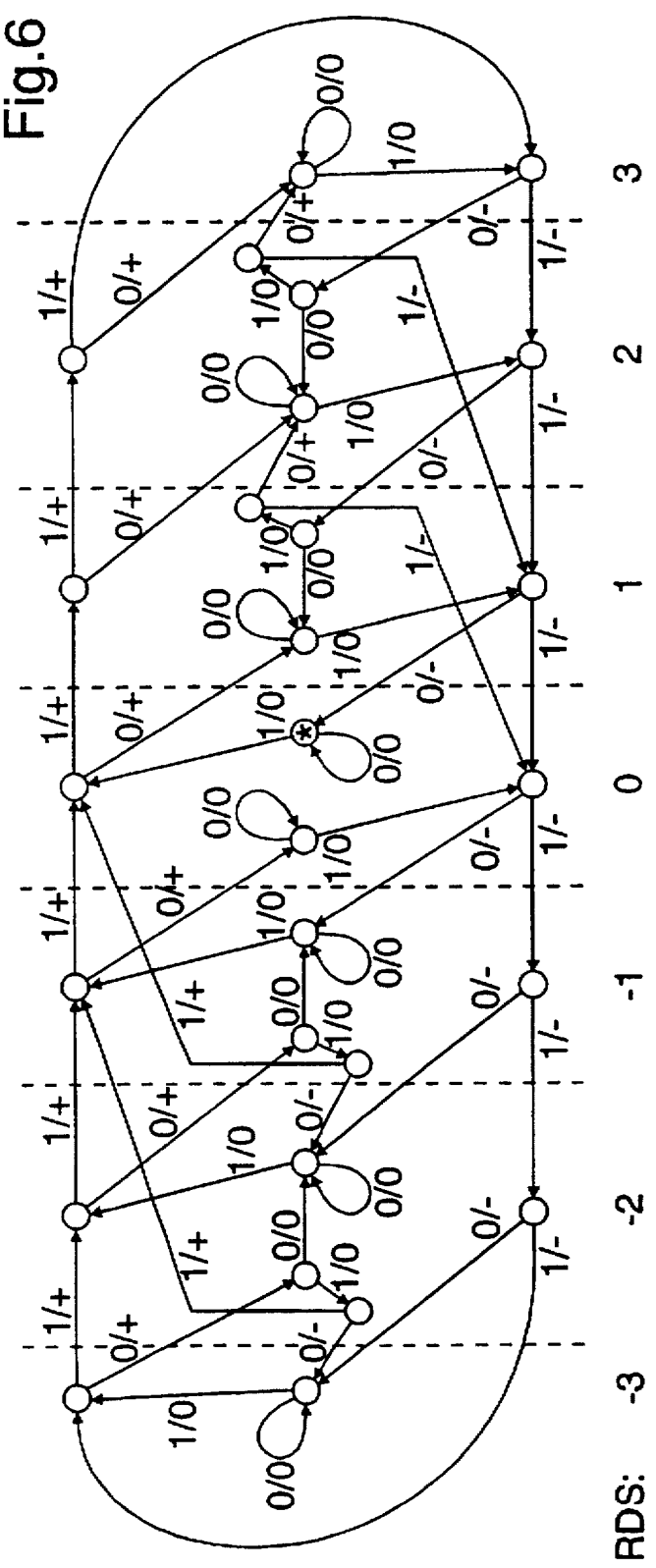

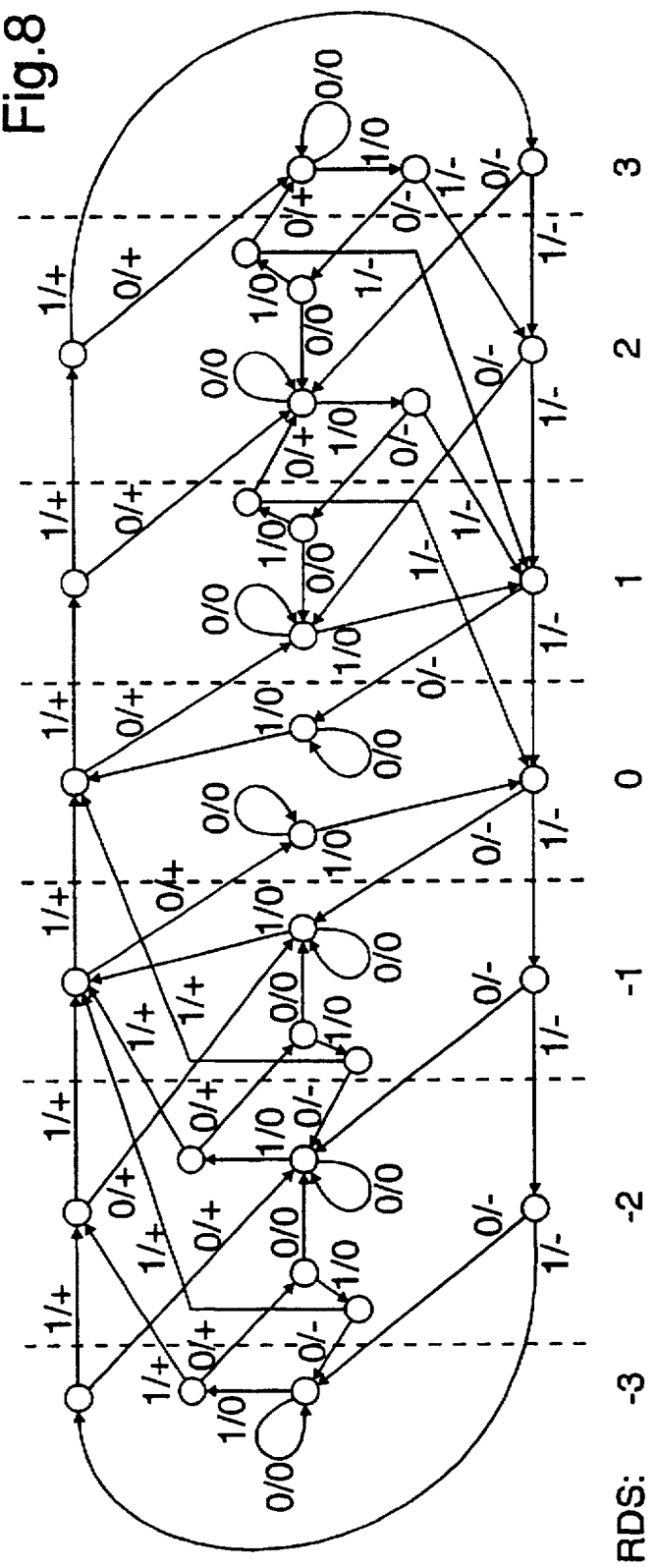

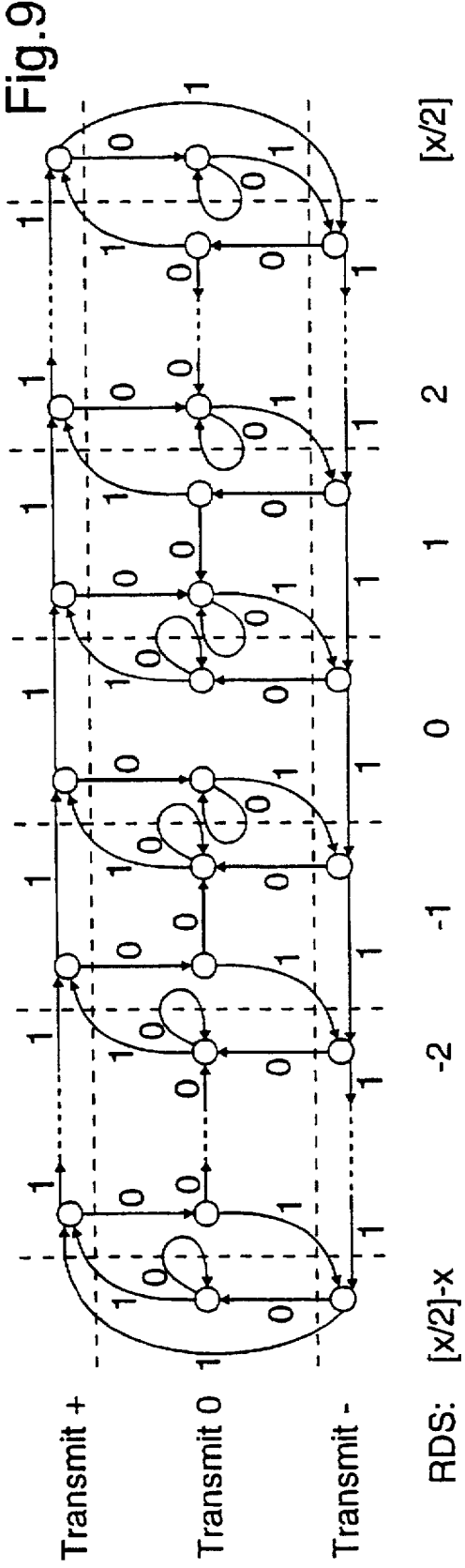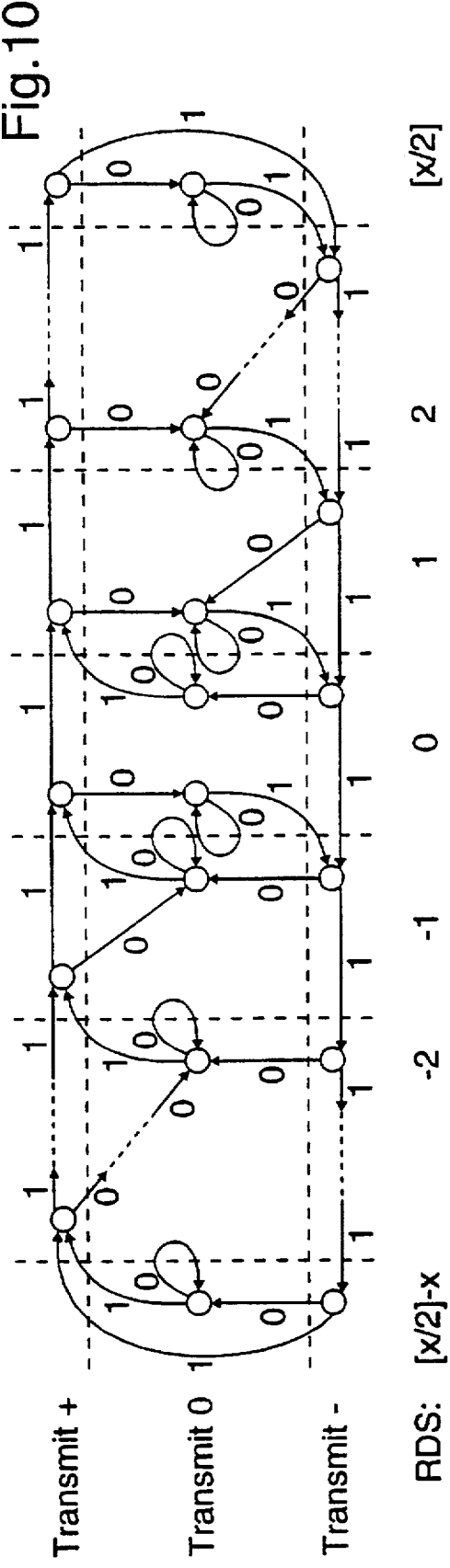

ENCODING DATA

TECHNICAL FIELD

This invention relates to methods and coders for encoding data.

BACKGROUND ART

The spread of personal computers and workstations has led to the development of networks for interconnecting such equipment and common resources such as printers and data storage devices. More powerful and sophisticated computing equipment and programs have progressively become available, allowing the processing of data in larger and larger quantities, for example in the form of database information and graphic images. These developments have placed increasing demands on the speed and capacity of networks.

Various new networking technologies have been proposed to cater for these demands. One such technology is the fibre distributed data interface (FDDI), which is based on the use of optical fibres and optical signals. However, practical experience has shown that although this technology can provide the required performance, it is relatively expensive, requiring the costly process of installing complete new networks of optical fibre, which is itself inherently expensive.

Accordingly attention has also been directed to the possibility of transferring data at high speed over existing wiring installations, thereby avoiding the cost of installing a new network and gaining additional return for the expense previously incurred in installing the existing wiring.

One possible technique along these lines involves the use of unshielded twisted-pair (UTP) telephone cables of the kind already used for lower-speed local-area networks. In this technique, described in European patent application No. 0 596 523, the required high data rate (100 Mbit/s) is achieved by transferring the data over four pairs of conductors, so that different portions of the data are transmitted simultaneously over respective conductor pairs. Each successive group of twenty bits of the data to be transmitted is split into four blocks each of five bits, and encoded by selecting six-bit code values from a predefined 5B/6B code table in accordance with the five-bit data values. The four encoded blocks are then transmitted along respective ones of the four conductor pairs. To limit the occurrence of undetected noise-induced corruption of the data, particular data word/code word combinations may be used together with specific relative timing of transmission of encoded blocks on different conductor pairs and a cyclic redundancy check (CRC) code, as described in European patent application No. 0 596 736. The code words are also selected to maintain d.c. balance on each individual conductor pair, by avoiding any long-term imbalance in the number of binary one and binary zero digits transmitted over the conductor pair. Thus the six-bit code words are selected for transmission in such a way that either each code word transmitted over a conductor pair contains equal numbers of binary one and binary zero digits (i.e. is inherently balanced), or has unequal numbers of these digits (i.e. is itself unbalanced) and is chosen to cancel any imbalance introduced by an earlier unbalanced code word.

This technique successfully attains an overall data rate of 100 Mbit/s over a cable containing four twisted pairs without exceeding regulatory limits on electromagnetic emission. However, it is desirable to be able also to communicate data at this overall data rate over cable containing fewer than four twisted conductor pairs. In particular it is desirable in some circumstances to be able to communicate data in full-duplex mode (i.e. with simultaneous transmission in both directions along a communications link) along a cable containing two so-called category 5 (data grade) UTP conductors; this requires communication along each UTP conductor at the full 100 Mbit/s data rate.

It is an object of this invention to provide a method and coder for encoding data which facilitates such communication.

DISCLOSURE OF INVENTION

According to one aspect of this invention there is provided a method of encoding binary data for communication wherein successive binary digits having first or second binary values are encoded as one of three signal levels, said method comprising the steps of:

selecting a first predetermined signal level to represent a binary digit if that digit has a first binary value;

selecting one of second and third predetermined signal levels to represent a binary digit if that digit has a second binary value, said first signal level being intermediate in value between said second and third signal levels, said second and third signal levels being of opposite polarity to one another, and selection between said second and third signal levels being determined by:

maintaining a cumulative sum of signal levels already selected;

selecting said second signal level if said cumulative sum has attained a first predetermined threshold;

selecting said third signal level if said cumulative sum has attained a second predetermined threshold different from said first predetermined threshold;

selecting whichever of said second and third signal levels is not the one of those signals most recently selected, if said cumulative sum does not satisfy a predetermined criterion and said first predetermined signal level has been selected at least once since selection of either said second or said third signal level;

selecting whichever of said second and third signals will change said cumulative sum towards a predetermined value, if said cumulative sum does satisfy said predetermined criterion and said first predetermined signal level has been selected at least once since selection of either said second or said third signal level; and otherwise selecting whichever of said second and third signal levels is the same as the one of those signals most recently selected.

According to another aspect of this invention there is provided a coder for encoding binary data for communication such that successive binary digits having first or second binary values are encoded as one of three signal levels, comprising:

first selection means for selecting a first predetermined signal level to represent a binary digit if that digit has a first binary value; and second selection means for selecting one of second and third predetermined signal levels to represent a binary digit if that digit has a second binary value, said first signal level being intermediate in value between said second and third signal levels, said second and third signal levels being of opposite polarity to one another, said second selection means having:

means for maintaining a cumulative sum of signal levels already selected;

means for selecting said second signal level if said cumulative sum has attained a first predetermined threshold;

means for selecting said third signal level if said cumulative sum has attained a second predetermined threshold different from said first predetermined threshold;

means for selecting whichever of said second and third signal levels is not the one of those signals most recently selected, if said cumulative sum does not satisfy a predetermined criterion and said first predetermined signal level has been selected at least once since selection of either said second or said third signal level;

means for selecting whichever of said second and third signals will change said cumulative sum towards a predetermined value, if said cumulative sum does satisfy said predetermined criterion and said first predetermined signal level has been selected at least once since selection of either said second or said third signal level; and means for selecting otherwise whichever of said second and third signal levels is the same as the one of those signals most recently selected.

BRIEF DESCRIPTION OF DRAWINGS

Methods and coders in accordance with this invention for encoding data for communication along unshielded twisted-pair cable will now be described, by way of example, with reference to the accompanying drawings, in which:

FIG. 1 shows the manner in which data may be formatted for communication over the cable;

FIG. 2 shows a first arrangement for encoding and communicating data over the cable;

FIG. 4 is a table of five-bit data values and corresponding six-bit code values;

FIG. 6 is a state diagram of a first form of encoder which can be used in the arrangement of FIG. 2;

FIG. 8 is a state diagram of a second form of encoder which can be used in the arrangement of FIG. 2;

FIG. 9 is a state diagram of a third form of encoder which can be used in the arrangement of FIG. 2;

FIG. 10 is a state diagram of a fourth form of encoder which can be used in the arrangement of FIG. 2;

BEST MODE FOR CARRYING OUT THE INVENTION & INDUSTRIAL APPLICABILITY

Figure 3:
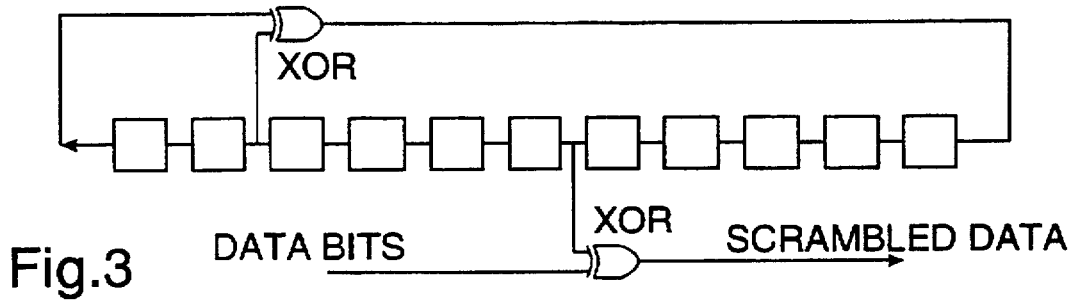
FIG. 3 is a schematic diagram of a scrambler shown in FIG. 2.

The present invention may be used in circumstances where a stream of data is communicated over one or more channels; if more than one channel is used, successive portions of the data stream are communicated simultaneously over different respective channels in order to obtain a higher bandwidth than would be possible if all the data were transmitted over a single such channel. For convenience the invention will be described in the context of two-way transmission of data over a cable having two channels, such as two pairs of so-called category 5 unshielded twisted pair (UTP) cabling, also known as data grade UTP. Each channel is used for data transmission in a respective direction. In practice the cable would, for example, form part of a network connecting many stations or nodes, such as personal computers, workstations, multi-user computers, printers or data storage units. Circuit devices associated with these stations would provide the necessary functions for assembling data and network operating information into frames or packets for transmission, for controlling access to the network and for transmitting and receiving physical signals on the cable (for example by differential signalling in the case of twisted-pair conductors). The present invention is independent of the particular details of these functions and may for example be implemented in conjunction with existing network technologies; since such technologies already incorporate known techniques for providing these functions, and the functions form no part of the present invention, they will not be described here.

Referring to FIGS. 1 and 2, a data frame intended to be communicated over a channel 22 is shown schematically at 10. This frame comprises: a binary digital message 12 to be transferred, starting with the leftmost bit as shown in FIG. 1, between stations on the network; and an associated thirty-two bit CRC block 14 containing check data derived from the message 12 in known manner in accordance with a predetermined cyclic redundancy check (CRC) algorithm. In the present example it is assumed that the CRC value is derived from the message using a polynomial of degree thirty-two, such as $$g(x)=x^{32}+x^{26}+x^{23}+x^{22}+x^{16}+x^{12}+x^{11}+x^{10}+x^8+x^7+x^5+x^4+x^2+x+1.$$

Prior to transmission the contents of the data frame 10 are scrambled by a scrambler 18 (FIG. 2) in a predetermined and reversible manner by combination with a pseudo-random binary sequence (PRBS). This ensures that the energy of the signal propagating over the channel 22 is distributed reasonably uniformly throughout the intended bandwidth of the signal, irrespective of any repetitive bit patterns which may occur in the data frame 10. The PRBS is generated according to the bit recurrence relation $$S[n]=S[n-9]XOR\ S[n-11]$$

using an 11-stage shift register and an exclusive-OR gate which combines the bit values from the ninth and eleventh stages of the register and feeds back to its first stage, as shown in FIG. 3. The bit sequence appearing at the fifth stage of the register is combined with the bits of the data frame 10 by another exclusive-OR gate to generate a scrambled data stream 16. The shift register is initialized with a preset 11-bit sequence (for example 11111111111).

For transmission over the channel 22 the scrambled data stream 16 is split into consecutive blocks of n binary digits, starting with the leftmost bit of the data stream, and each block is encoded by a block encoder 19 (described in more detail below) into a respective block of n+1 binary digits. Each successive binary digit supplied by the encoder 19 is then further encoded for transmission as a corresponding three-level (ternary) symbol, by a binary to ternary encoder 20. The ternary symbols are represented herein by 0 (typically a zero-volt signal on the channel 22), + (typically a positive polarity signal), and − (typically a negative polarity signal of the same magnitude as the + signal).

A significant parameter of the codes discussed below is the running digital sum (RDS), which is related to the d.c. balance on a communications channel using the code. In the case of a binary signal, the RDS is the difference between the accumulated totals of binary ones and zeroes in the signal (i.e. treating binary 0 as being opposite in polarity to binary 1). For the ternary codes discussed herein, the RDS is the difference between the accumulated totals of + and −symbols in the signal (i.e. the difference between the number of symbols of one polarity and the number of the opposite polarity, the 0 symbol being considered to have no polarity).

The block encoder 19 may be, for example, a 5B/6B encoder (n=5) arranged to encode five-bit data blocks into six-bit values according to a 5B/6B substitution table shown in FIG. 4, which may be held for example as a look-up table in a read-only memory. These particular substitutions are selected in part to maintain d.c. balance within the encoded binary data stream, by ensuring that after each coded data block the RDS of the binary signal is no more than two. In the 5B/6B table shown in FIG. 4 twenty of the five-bit data blocks are assigned unique codes comprising respective ones of the twenty six-bit values which contain three binary zeroes and three binary ones. The remaining twelve data blocks are each assigned two possible six-bit code values, one containing two binary zeroes and the other containing four. The encoding is implemented so that on the first occasion one of these twelve data blocks occurs, the corresponding two-zero encoding (for example) is selected; on the next occasion that any of these twelve data blocks occurs, the corresponding four-zero encoding is used; thereafter the use of the two-zero and four-zero encodings continues to alternate for each occurrence of any of these twelve data blocks. Thus the numbers of two-zero and four-zero six-bit codes will differ at most by one, maintaining an average of three binary zeroes per six-bit code and providing the desired d.c. balance (or limited RDS). In FIG. 1 illustrative five-bit (scrambled) data blocks are indicated in bold characters, and corresponding six-bit code values are indicated immediately below them in normal weight characters.

Figure 5:
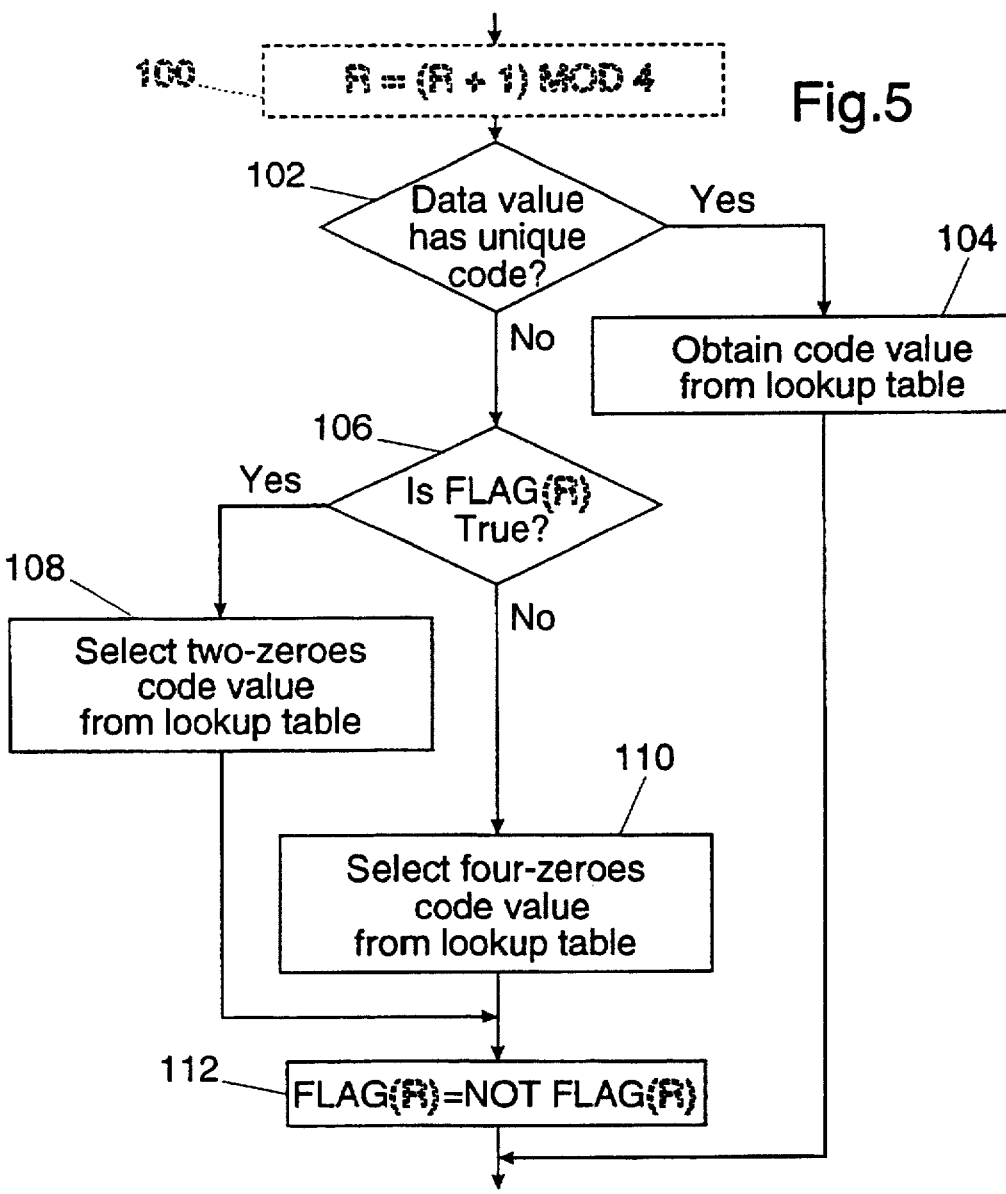
FIG. 5 is a flow diagram of a method for encoding data blocks according to the code table in FIG. 4.

FIG. 5 shows a flow diagram of a method for implementing this encoding both in the arrangement of FIG. 1 and in the arrangement of FIG. 11 to be described later. The steps and text depicted in dashed outline relate only to encoding in the arrangement of FIG. 11 and may be ignored for the purposes of the present description relating to FIG. 1. Referring to FIG. 5, at step 102 the data value to be encoded is tested to check whether it has one or two corresponding six-bit code values. If there is a unique corresponding code value, the procedure obtains that value from the look-up table at step 104 and exits. Otherwise the procedure advances to step 106, where a boolean flag is tested. If the flag is 'true', the procedure selects the code value containing only two binary zeroes, at step 108; if the flag is 'false' the code value containing four zeroes is selected, at step 110. In either case the procedure then inverts the value of the flag at step 112 before exiting.

The binary to ternary encoder 20 converts each binary digit output from the block encoder 19 into a corresponding ternary symbol (0, + or −), according to a coding scheme designed to restrict severely the power spectral density (PSD) of the signal on the channel 22 at frequencies above 0.25 times the symbol rate, while maintaining acceptable limits on maximum run length of sequences of the same ternary value and on the RDS of the ternary symbol stream.

To this end the encoder 20 updates a record of the RDS as each output symbol is generated, for comparison with predetermined upper and lower RDS thresholds. These thresholds are selected in accordance with the amount of d.c. imbalance which can be tolerated in a particular case, at the same time having regard for the effect on high frequency PSD of any particular RDS threshold. In general, a lower RDS threshold will tend to increase the PSD somewhere in the higher frequency portion of the transmitted signal's spectrum. Whenever the RDS reaches either of the upper and lower RDS thresholds, the encoder 20 will determine the polarity of the next non-zero ternary symbol to be output so as to change the RDS back towards a predetermined value of, in this case, zero.

In addition, whenever a non-zero ternary symbol is to be output following one or more 0 symbols, the encoder 20 tests whether the RDS satisfies an additional predetermined criterion, and in accordance with the result of that test and possible additional tests of the data stream determines whether or not the polarity of the non-zero ternary symbol to be output will be opposite to the polarity of the non-zero ternary symbol which preceded those one or more 0 symbols. The precise form of this predetermined criterion and of the possible additional tests can be selected to control the form of the PSD in the higher frequency portion of the transmitted signal's spectrum.

One example of the encoding which can be performed by the binary to ternary encoder 20 is defined in the following truth table:

TABLE 1

| Prev. I/P bit D(n − 2) | Prev. I/P bit D(n − 1) | Current I/P bit D(n) | Next I/P bit D(n + 1) | Last O/P polarity | RDS(n) = min. | RDS(n) − ve | RDS(n) + ve | RDS(n) = max. | Ternary O/P (n + 1) |
|---|---|---|---|---|---|---|---|---|---|
| X | X | 0 | X | X | X | X | X | X | 0 |
| X | 0 | 1 | 1 | X | X | F | T | X | − |
| 0 | 0 | 1 | X | X | X | F | T | X | − |
| 0 | 0 | 1 | X | X | X | T | F | X | + |
| 1 | 0 | 1 | 0 | − | F | X | X | F | + |
| 1 | 0 | 1 | 0 | + | F | X | X | F | − |
| X | 0 | 1 | 1 | X | X | T | F | X | + |
| X | 0 | 1 | X | + | X | F | F | X | − |
| X | 0 | 1 | X | − | X | F | F | X | + |
| X | 1 | 1 | X | + | F | X | X | F | + |
| X | 1 | 1 | X | − | F | X | X | F | − |
| X | X | 1 | X | X | F | X | X | T | − |
| X | X | 1 | X | X | T | X | X | F | + |

In this table D(n) represents the binary digit which is currently being received by the encoder 20, D(n−1) represents the previous digit, D(n−2) represents the digit before that, and D(n+1) represents the digit to follow the one currently being received; X indicates a "don't care" condition or value; F represents a state in which the condition at the head of the relevant column is False, and T represents a state in which that condition is True. Each row of the table defines a different possible combination of binary digits and states, and the symbol at the right-hand end of the row indicates the ternary symbol which is output for the respective combination.

This truth table implements the following set of rules for selecting a ternary symbol for each binary digit:

a) a binary 1 is always encoded as a ternary + or a ternary −;

b) a binary 0 is always encoded as a ternary 0;

c) if a run of one or more ternary 0's occurs, the polarity of the following non-zero symbol is opposite to the polarity of the non-zero symbol preceding that run of 0's, unless:

i) the RDS is positive (i.e. greater than zero) and two or more ternary 0's have occurred, in which case the following non-zero symbol is −; or ii) the RDS is negative (i.e. less than zero) and two or more ternary 0's have occurred, in which case the following non-zero symbol is +; or iii) the RDS is positive and two or more non-zero ternary symbols follow a ternary 0, in which case those non-zero ternary symbols are − symbols; or iv) the RDS is negative and two or more non-zero ternary symbols follow a ternary 0, in which case those non-zero ternary symbols are + symbols;

d) if the RDS reaches the predetermined upper or lower RDS threshold (min. or max.), the polarity of the next occurring non-zero symbol is opposite to the polarity of the most recently occurring non-zero symbol.

The encoder 20 can conveniently be implemented as a state machine, and FIG. 6 shows the state diagram for such a machine arranged to implement the encoding defined in Table 1, with upper and lower RDS thresholds of 3 and −3 respectively. In this state diagram each possible state is indicated by a circle, and possible transitions between states are defined by arrows. Each transition arrow has an associated label, in the format B/T: B indicates the input binary digit value which causes the associated transition to occur, and T indicates the output ternary symbol which is generated in conjunction with that transition. When encoding commences, one state is arbitrarily selected as a starting state. This state machine incorporates a one-bit delay between input of a binary digit and output of the ternary symbol actually representing that digit, to facilitate implementation of rules (c)(iii) and (c)(iv) above. Thus a non-zero output ternary symbol actually corresponds to the preceding binary 1 input, rather than to whatever binary digit is currently being input.

In FIG. 1 the ternary code symbols corresponding to the bits in the encoded six-bit counterparts of the illustrative five-bit data blocks are indicated below those bits; because of the one-bit delay incorporated in the state machine of FIG. 6, there is a one-symbol offset between each encoded binary digit and its corresponding ternary symbol, as indicated by the dashed arrows in FIG. 1. In deriving these illustrative symbols it has been assumed that the starting state in the state diagram of FIG. 6 is the state indicated with an asterisk (*) in the section where the RDS is zero.

The encoded ternary-symbol blocks are transmitted over the channel 22 (leftmost symbol first), and upon receipt at their destination they are detected and compensation is made in known manner for the effects of timing drift and other signal degradation to produce a restored digital data stream. This data stream is then fed to a ternary to binary decoder 24 which derives the binary digit corresponding to each successive ternary symbol. This may be done by assigning the binary value 0 for each occurrence of ternary 0, and the binary value 1 for each occurrence of either ternary + or ternary −.

The binary encoded data are then supplied to a block decoder 25 which derives the five-bit data word corresponding to each six-bit encoded block in accordance with the 5B/6B encoding table given in FIG. 4. The decoder 25 also maintains a running count of the imbalance between the totals of binary ones and binary zeroes in the code words which it receives.

For decoding, a broadly similar procedure to that of FIG. 5 may be used. However, instead of obtaining a code value at step 104, the decoder 25 checks that the received code value is valid, and then obtains the corresponding data value. Likewise, at steps 108 and 110, the decoder 25 checks that the received code value is valid and has the expected number of binary zero bits, and then obtains the required data value. If any of these checks fails, the decoder determines that an error has occurred during transmission of the data frame and the entire frame is rejected. Otherwise the decoder 25 passes the decoded data to a de-scrambler 26 which reverses the scrambling effected by the scrambler 18. This is accomplished by generating a PRBS, and combining successive bits of this PRBS with successive bits of the decoded data stream in an exclusive-OR operation, in the same manner as described for the scrambler 18.

The descrambled data stream is passed to a CRC check circuit 28 which assembles the complete data frame and recalculates the CRC value for comparison with the transmitted CRC value. Assuming the CRC check does not reveal any corruption of the data, the frame is then available for further processing and use.

Figure 7:
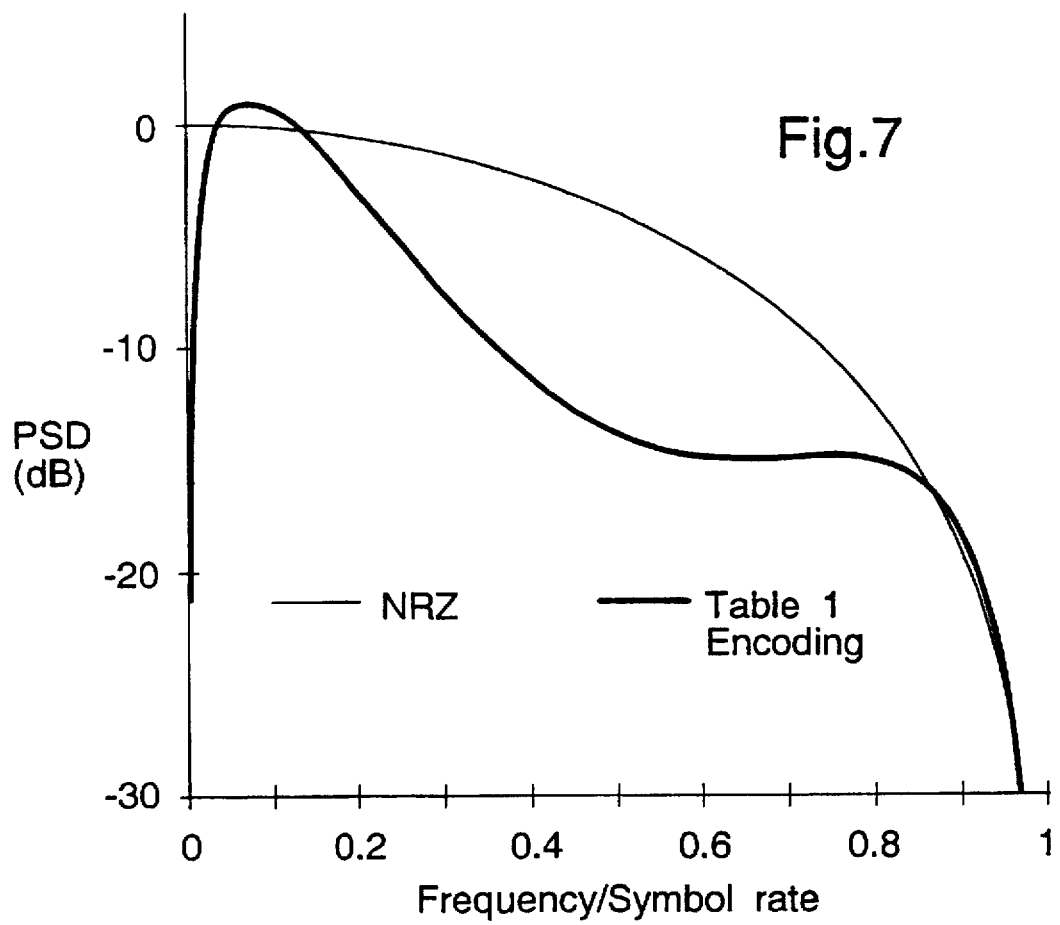
FIG. 7 is a graph of power spectral density (PSD) of a random signal encoded using the encoder defined by FIG. 6.

The binary-to-ternary encoding defined by Table 1 above has several advantageous properties. The RDS is limited to a predefined value, with the result that the PSD is very low at d.c. and low frequencies (<0.01 times the symbol rate on the channel 22). On the other hand, for a data bit rate of 100 Mbit/s (equivalent to a symbol rate of 120 Mbaud in the above example), the PSD at frequencies above 30 MHz is considerably lower than that below this frequency: most of the signal energy is concentrated into the bandwidth up to 30 MHz. This is illustrated in FIG. 7, which shows the PSD for a random binary non-return to zero (NRZ) signal and for the same signal encoded in accordance with Table 1, as a function of frequency, which is expressed as a fraction relative to the symbol rate on the channel 22. Thus, for a symbol rate of 120 Mbaud, the PSD at 30 MHz is the value shown at a relative frequency of 0.25. Another advantage of this encoding is that, as described above, decoding from ternary to binary is readily accomplished, for example using a rectifier, because of the direct correspondence between binary 0 and ternary 0 on the one hand, and binary 1 and ternary + or − on the other.

It is possible to use other binary $t_o$ ternary encodings in the encoder 20. Table 2 below shows the truth table for a modification of the encoding defined in Table 1 above, using the same notation as in that table:

TABLE 2

| Prev. I/P bit D(n − 3) | Prev. I/P bit D(n − 2) | Prev. I/P bit D(n − 1) | Current I/P bit D(n) | Next I/P bit D(n + 1) | Last O/P polarity | RDS(n) = min. | RDS(n) − ve | RDS(n) + ve | RDS(n) = max. | Ternary O/P (n + 1) |
|---|---|---|---|---|---|---|---|---|---|---|
| X | X | X | 0 | X | X | X | X | X | X | 0 |
| X | X | 0 | 1 | 1 | X | X | F | T | X | − |
| X | 0 | 0 | 1 | X | X | X | F | T | X | − |
| X | 0 | 0 | 1 | X | X | X | T | F | X | + |
| 0 | 1 | 0 | 1 | 0 | − | F | X | X | F | + |
| 0 | 1 | 0 | 1 | 0 | + | F | X | X | F | − |
| X | X | 0 | 1 | 1 | X | X | T | F | X | + |
| X | X | 0 | 1 | X | + | X | F | F | X | − |
| X | X | 0 | 1 | X | − | X | F | F | X | + |
| X | X | 1 | 1 | X | + | F | X | X | F | + |
| X | X | 1 | 1 | X | − | F | X | X | F | − |
| X | X | X | 1 | X | X | F | X | X | T | − |
| X | X | X | 1 | X | X | T | X | X | F | + |
| 1 | 1 | 0 | 1 | 0 | X | X | F | T | X | − |
| 1 | 1 | 0 | 1 | 0 | X | X | T | F | X | + |

D(n − 3) represents the binary digit which occurred three bits before the digit which is currently being received by the encoder 20.

This truth table implements the following set of rules for selecting a ternary symbol for each binary digit:

a) a binary 1 is always encoded as a ternary + or a ternary −;

b) a binary 0 is always encoded as a ternary 0;

c) if a run of one or more ternary 0's occurs, the polarity of the following non-zero symbol is opposite to the polarity of the non-zero symbol preceding that run of 0's, unless:

i) the RDS is positive (i.e. greater than zero) and two or more ternary 0's have occurred, in which case the following non-zero symbol is −; or ii) the RDS is negative (i.e. less than zero) and two or more ternary 0's have occurred, in which case the following non-zero symbol is +; or iii) the RDS is positive and two or more non-zero ternary symbols follow a ternary 0, in which case those non-zero ternary symbols are − symbols; or iv) the RDS is negative and two or more non-zero ternary symbols follow a ternary 0, in which case those non-zero ternary symbols are + symbols; or v) the RDS is positive and the run of ternary 0's is preceded by a run of two or more non-zero ternary symbols, in which case the following non-zero symbol is −; or vi) the RDS is negative and the run of ternary 0's is preceded by a run of two or more non-zero ternary symbols, in which case the following non-zero symbol is +;

d) if the RDS reaches the predetermined upper or lower RDS threshold (min. or max.), the polarity of the next occurring non-zero symbol is opposite to the polarity of the most recently occurring non-zero symbol.

FIG. 8 shows the state diagram for a state machine arranged to implement the encoding defined in Table 2, with upper and lower RDS thresholds of 3 and −3 respectively, and using the same conventions as in FIG. 6.

Another possible encoding is defined by the truth table in Table 3, again with the same notation as in Tables 1 and 2:

TABLE 3

| Prev. I/P bit D(n − 2) | Prev. I/P bit D(n − 1) | Current I/P bit D(n) | Last O/P polarity | RDS(n) = min. | RDS(n) − ve | RDS(n) + ve | RDS(n) = max. | Ternary O/P (n + 1) |
|---|---|---|---|---|---|---|---|---|
| X | X | 0 | X | X | X | X | X | 0 |
| 0 | 0 | 1 | X | X | F | T | X | − |
| 0 | 0 | 1 | X | X | T | F | X | + |
| 1 | 0 | 1 | − | F | X | X | F | + |
| 1 | 0 | 1 | + | F | X | X | F | − |
| X | 0 | 1 | + | X | F | F | X | − |
| X | 0 | 1 | − | X | F | F | X | + |
| X | 1 | 1 | + | F | X | X | F | + |
| X | 1 | 1 | − | F | X | X | F | − |
| X | X | 1 | X | F | X | X | T | − |
| X | X | 1 | X | T | X | X | F | + |

This truth table implements the following set of rules for selecting a ternary symbol for each binary digit:

a) a binary 1 is always encoded as a ternary + or a ternary −;

b) a binary 0 is always encoded as a ternary 0;

c) if a run of one or more ternary 0's occurs, the polarity of the following non-zero symbol is opposite to the polarity of the non-zero symbol preceding that run of 0's, unless:

i) the RDS is positive (i.e. greater than zero) and two or more ternary 0's have occurred, in which case the following non-zero symbol is −; or ii) the RDS is negative (i.e. less than zero) and two or more ternary 0's have occurred, in which case the following non-zero symbol is +;

d) if the RDS reaches the predetermined upper or lower RDS threshold (min. or max.), the polarity of the next occurring non-zero symbol is opposite to the polarity of the most recently occurring non-zero symbol.

FIG. 9 shows the state diagram for a state machine arranged to implement the encoding defined in Table 3, with upper and lower RDS thresholds of x/2 and −x/2 respectively. Each possible state is indicated by a circle, and possible transitions between states are defined by arrows. Each transition arrow has an associated label indicating the input binary digit value which causes the associated transition to occur; the output ternary symbol which is generated in response to that transition is indicated at the left of the diagram, in alignment with the destination state of the relevant transition.

Another possible encoding is defined by the truth table in Table 4, again with the same notation as in previous tables:

TABLE 4

| Prev. I/P bit D(n − 1) | Current I/P bit D(n) | Last O/P polarity | RDS(n) = min. | RDS(n) − ve | RDS(n) + ve | RDS(n) = max. | Ternary O/P (n + 1) |
|---|---|---|---|---|---|---|---|
| X | 0 | X | X | X | X | X | 0 |
| 0 | 1 | X | X | F | T | X | − |
| 0 | 1 | X | X | T | F | X | + |
| 0 | 1 | + | X | F | F | X | − |
| 0 | 1 | − | X | F | F | X | + |
| 1 | 1 | + | F | X | X | F | + |
| 1 | 1 | X | F | X | X | T | − |
| 1 | 1 | − | F | X | X | F | − |
| 1 | 1 | X | T | X | X | F | + |

This truth table implements the following set of rules for selecting a ternary symbol for each binary digit:

a) a binary 1 is always encoded as a ternary + or a ternary −;

b) a binary 0 is always encoded as a ternary 0;

c) if a run of one or more ternary 0's occurs, the polarity of the following non-zero symbol is opposite to the polarity of the non-zero symbol preceding that run of 0's, unless:

i) the RDS is positive (i.e. greater than zero), in which case the following non-zero symbol is −; or ii) the RDS is negative (i.e. less than zero), in which case the following non-zero symbol is +;

d) if the RDS reaches the predetermined upper or lower RDS threshold (min. or max.), the polarity of the next occurring non-zero symbol is opposite to the polarity of the most recently occurring non-zero symbol.

FIG. 10 shows the state diagram for a state machine arranged to implement the encoding defined in Table 4, with upper and lower RDS thresholds of x/2 and −x/2 respectively, and using the same conventions as in FIG. 9.

Figure 12:
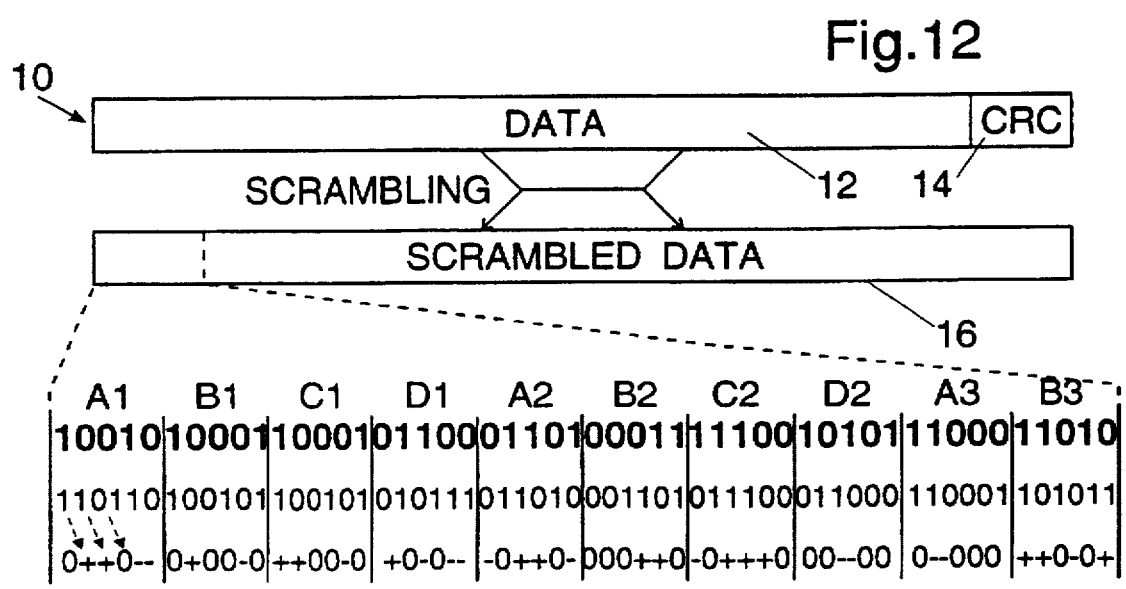
FIG. 12 shows the manner in which data are formatted for communication over the cable in the arrangement of FIG. 11.

As noted above, systems for transmitting data at an effective data rate of 100 Mbit/s over a cable containing four twisted pairs have previously been described in European patent applications Nos. 0 596 523 and 0 596 736. It can be cost-effective to use components intended for such a system to implement a binary-to-ternary encoding as described above. FIGS. 11 and 12 illustrate an arrangement for accomplishing this.

Figure 11:
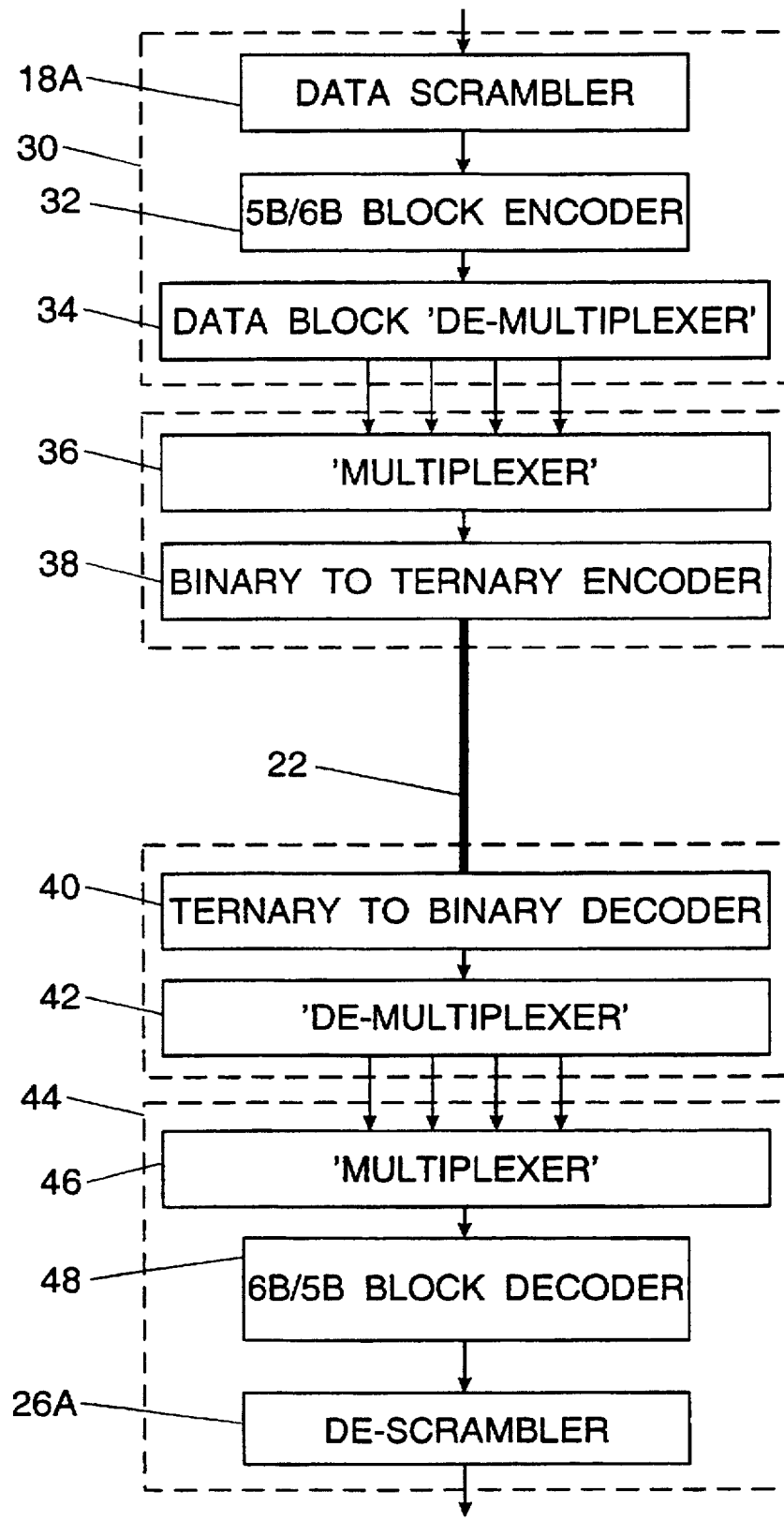
FIG. 11 shows a second arrangement for encoding and communicating data over the cable.

Referring to FIGS. 11 and 12, the data frame 10 to be transmitted over the channel 22 is supplied to a unit 30 containing a scrambler 18A similar in function and operation to the scrambler 18 in FIG. 2, a 5B/6B block encoder 32 (corresponding to the block encoder 19 in FIG. 2), and a 'de-multiplexer' 34. This unit 30 is designed primarily for use in a system transferring data over four twisted pairs, each pair carrying a respective data stream (herein labelled A to D). In such a system successive five-bit blocks in the data frame 10 are assigned among the four data streams on a cyclic basis and starting with the block containing the leftmost bit of the frame 10. Thus this first block, indicated by A1 in FIG. 12, is associated with stream A, the next block (B1) with stream B, the third block (C1) with stream C and the fourth (D1) with stream D. The cycle then repeats, with stream A receiving the fifth block (A2) and so on.

Preferably the scrambler 18A can save and restore four copies of the contents of its shift register. Thus, for the first five-bit block A1, a respective initializing sequence is loaded into the shift register and the block A1 is scrambled; the contents of the shift register are saved, a new initializing sequence, from a different quadrant of the PRBS, is loaded into the register, and the block B1 is scrambled; these operations are repeated for each of the blocks C1 and D1; then the shift register contents after scrambling of the block A1 are restored, and the block A2 is scrambled; and so on.

The scrambled five-bit data blocks are encoded by the encoder 32 into six-bit values as described below, and the encoded blocks are then temporarily distributed by the 'de-multiplexer' 34 among the four data streams A to D.

The use of the unit 30 in the present arrangement provides economies in the cost of implementing circuit functions which are required irrespective of the number of conductors used to transmit data, and facilitates design of other parts of an overall system independently of the physical details of the transmission channel or channels.

The data streams A to D produced by the de-multiplexer 34 are recombined by a block multiplexer 36 into a single stream of encoded blocks, the encoded form of block A1 being followed by the encoded form of blocks B1, C1, D1, A2, B2, and so on. This single stream of encoded blocks is supplied to a binary-digit to ternary-symbol encoder 38, which operates in the same manner as the encoder 20 in FIG. 2 to provide the actual encoded data stream for transmission over the channel 22.

The 5B/6B block encoder 32 operates in a similar manner to the encoder 19 in FIG. 2, but with additional functionality to maintain d.c. balance (i.e. limit the RDS) within each of the individual data streams A to D (to provide for the case where they are transmitted in parallel over a cable having four twisted pairs). Thus the use of the two-zero and four-zero encodings in FIG. 4 alternates for each data stream A to D individually upon each occurrence of any of the twelve relevant five-bit data blocks in that data stream. In FIG. 12 illustrative five-bit (scrambled) data blocks are indicated in bold characters, and corresponding six-bit code values and ternary symbols are indicated immediately below them in normal weight characters.

The method shown in FIG. 5 for implementing the 5B/6B encoding is modified in this case to include the steps and text depicted in dashed lines. Specifically a step 100 is included in which a counter R is incremented according to the relationship $R=(R+1)\text{modulo } 4$ so that the counter cyclically takes on the values zero to three inclusive. The purpose of this counter is to keep track of the data stream A to D to which the current data value relates. Step 106 is modified so that one of four boolean flags (corresponding to the data streams A to D) is tested, the flag being selected in accordance with the current value of the counter R. Likewise at step 112 the flag whose value is to be inverted is selected in accordance with the value of the counter R.

When the encoded data blocks reach their destination on the channel 22 they are detected and compensation is made in known manner for the effects of timing drift and other signal degradation to produce a restored digital data stream. This data stream is then fed to a decoding circuit 40 which derives the binary digit corresponding to each successive ternary symbol. This may be done by assigning the binary value 0 for each occurrence of ternary 0, and the binary value 1 for each occurrence of either ternary + or ternary –.

The binary encoded data from the decoder 40 are then supplied to a de-multiplexer 42 which operates analogously to the de-multiplexer 34 to produce four data streams A to D, which are then 'multiplexed' back together by a multiplexer 46 forming part of a multiplexer/decoder unit 44 primarily intended for use in a system transmitting data over four twisted pairs. The resulting data stream is fed to a block decoder 48 in the unit 44, and this decoder derives the five-bit data word corresponding to each six-bit encoded block in accordance with the 5B/6B encoding table in FIG. 4. The decoder 48 also maintains a running count for each data stream A to D of the imbalance between the totals of binary ones and binary zeroes in the code words which it receives.

For decoding, a broadly similar procedure to that of FIG. 5 (including items in dashed lines) may be used. However, instead of obtaining a code value at step 104, the decoder 48 checks that the received code value is valid, and then obtains the corresponding data value. Likewise, at steps 108 and 110, the decoder 48 checks that the received code value is valid and has the expected number of binary zero bits, and then obtains the required data value. If any of these checks fails, the decoder determines that an error has occurred during transmission of the data frame and the entire frame is rejected. Otherwise the decoder 48 passes the decoded data to a de-scrambler 26A in the unit 44, to reverse the scrambling effected by the scrambler 18A.

The descrambled data stream is passed to a CRC check circuit (not shown) which assembles the complete data frame and recalculates the CRC value for comparison with the transmitted CRC value. Assuming the CRC check does not reveal any corruption of the data, the frame is then available for further processing and use.

In the embodiments described above, it has been assumed that a binary 0 corresponds to a ternary 0, and a binary 1 corresponds to a ternary + or –. The invention may also be implemented with the reverse correspondence, i.e. a binary 1 corresponds to a ternary 0 and a binary 0 corresponds to a ternary + or –. Although the invention has been described in the context of ternary encoding of a binary block code (i.e. the 5B/6T code of FIG. 4), the invention is applicable to encoding of any binary digit stream irrespective of its internal data structure.

For clarity the invention has been described in the context of a system in which the upper and lower RDS thresholds are equal in magnitude and opposite in polarity, and a predetermined value of zero is used both for comparison with the RDS in rule (c) of each of the sets of rules set out above, and as the value towards which the RDS is changed in rule (d). However, the invention is also applicable in circumstances where the upper and lower RDS thresholds are not equal, nor even of different polarities, and the predetermined value may be non-zero (although it will be a value between the upper and lower thresholds). In such circumstances the system operates with a permanent offset related to the predetermined non-zero value.

I claim:

1. A method of encoding binary data for communication wherein successive binary digits having first or second binary values are encoded as one of three signal levels, said method further controlling said encoding to assure that a running digital sum of said signal levels remains within predetermined thresholds to restrict any d.c. imbalance on a communication channel, said method comprising the steps of:

selecting a first predetermined signal level to represent a binary digit if that digit has a first binary value;

selecting one of second and third predetermined signal levels to represent a binary digit if that digit has a second binary value, said first signal level being intermediate in value between said second and third signal levels, said second and third signal levels being of opposite polarity to one another, and selection between said second and third signal levels being determined by:

maintaining a cumulative sum of signal levels already selected;

selecting said second signal level if said cumulative sum has attained a first predetermined threshold;

selecting said third signal level if said cumulative sum has attained a second predetermined threshold different from said first predetermined threshold;

selecting whichever of said second and third signal levels is not the one of those signals most recently selected, if said cumulative sum does not satisfy a predetermined criterion and said first predetermined signal level has been selected at least once since selection of either said second or said third signal level;

selecting whichever of said second and third signals will change said cumulative sum towards a predetermined value, if said cumulative sum does satisfy said predetermined criterion and said first predetermined signal level has been selected at least once since selection of either said second or said third signal level; and otherwise selecting whichever of said second and third signal levels is the same as the one of those signals most recently selected.

2. The method of claim 1, wherein said predetermined criterion is that said cumulative sum does not equal said predetermined value and said first predetermined signal level has been selected at least twice since selection of either said second or said third signal level.

3. The method of claim 1, wherein said predetermined criterion is that said cumulative sum does not equal said predetermined value.

4. The method of claim 1, wherein said predetermined criterion is that said cumulative sum does not equal said predetermined value and:

said first predetermined signal level has been selected at least twice since selection of either said second or said third signal level; or said first predetermined signal level has been selected at least once and thereafter either of said second and said third signal levels are to be selected at least twice in succession.

5. The method of claim 1, wherein said first and second predetermined thresholds have equal magnitudes and opposite polarities to one another, and said predetermined value is zero.

6. A method of encoding binary data for communication over a communication channel to assure that a running digital sum of encoded binary data remains within predetermined thresholds to restrict any d.c. imbalance on said communication channel, wherein successive binary digits are encoded as one of three signal levels in accordance with the following truth table:

| Prev. I/P bit $D(n-2)$ | Prev. I/P bit $D(n-1)$ | Current I/P bit $D(n)$ | Next I/P bit $D(n+1)$ | Last O/P polarity | RDS(n) = min. | RDS(n) < PV | RDS(n) > PV | RDS(n) = max. | Ternary O/P $(n+1)$ |
|---|---|---|---|---|---|---|---|---|---|
| X | X | A | X | X | X | X | X | X | 0 |
| X | A | B | B | X | X | F | T | X | − |
| A | A | B | X | X | X | F | T | X | − |
| A | A | B | X | X | X | T | F | X | + |
| B | A | B | A | − | F | X | X | F | + |
| B | A | B | A | + | F | X | X | F | − |
| X | A | B | B | X | X | T | F | X | + |
| X | A | B | X | + | X | F | F | X | − |
| X | A | B | X | − | X | F | F | X | + |
| X | B | B | X | + | F | X | X | F | + |
| X | B | B | X | − | F | X | X | F | − |
| X | X | B | X | X | F | X | X | T | − |
| X | X | B | X | X | T | X | X | F | + | wherein D(n) represents a binary digit which is currently being received, D(n−1) represents an immediately preceding digit, D(n−2) represents a digit immediately preceding digit D(n−1), D(n+1) represents a digit to follow the one currently being received, PV represents a predetermined value, X indicates a "don't care" condition, A represents a first binary value, B represents a second binary value, F represents a state in which a condition is false, T represents a state in which that condition is true, and RDS signifies running digital sum of ternary symbols already produced, said encoding assuring that the RDS remains within predetermined thresholds to restrict said d.c. imbalance on said communication channel.

7. A method of encoding binary data for communication over a communication channel to assure that a running digital sum of encoded binary data remains within predetermined thresholds to restrict any d.c. imbalance on said communication channel, wherein successive binary digits are encoded as one of three signal levels in accordance with the following truth table:

wherein D(n) represents a binary digit which is currently being received, D(n−1) represents an immediately preceding digit, D(n−2) represents a digit immediately preceding digit D(n−1), D(n−3) represents a digit immediately preceding digit D(n−2), D(n+1) represents a digit to follow the one currently being received, PV represents a predetermined value, X indicates a "don't care" condition, A represents a first binary value, B represents a second binary value, F represents a state in which a condition is false, T represents a state in which that condition is true, and RDS signifies running digital sum of ternary symbols already produced, said encoding assuring that the RDS remains within predetermined thresholds to restrict said d.c. imbalance on said communication channel.

8. A method of encoding binary data for communication over a communication channel to assure that a running digital sum of encoded binary data remains within predetermined thresholds to restrict any d.c. imbalance on said communication channel, wherein successive binary digits are encoded as one of three signal levels in accordance with the following truth table:

| Prev. I/P bit $D(n-3)$ | Prev. I/P bit $D(n-2)$ | Prev. I/P bit $D(n-1)$ | Current I/P bit $D(n)$ | Next I/P bit $D(n+1)$ | Last O/P polarity | RDS(n) = min. | RDS(n) < PV | RDS(n) > PV | RDS(n) = max. | Ternary O/P $(n+1)$ |
|---|---|---|---|---|---|---|---|---|---|---|
| X | X | X | A | X | X | X | X | X | X | 0 |
| X | X | A | B | B | X | X | F | T | X | − |
| X | A | A | B | X | X | X | F | T | X | − |
| X | A | A | B | X | X | X | T | F | X | + |
| A | B | A | B | A | − | F | X | X | F | + |
| A | B | A | B | A | + | F | X | X | F | − |
| X | X | A | B | B | X | X | T | F | X | + |
| X | X | A | B | X | + | X | F | F | X | − |
| X | X | A | B | X | − | X | F | F | X | + |
| X | X | B | B | X | + | F | X | X | F | + |
| X | X | B | B | X | − | F | X | X | F | − |
| X | X | X | B | X | X | F | X | X | T | − |
| X | X | X | B | X | X | T | X | X | F | + |
| B | B | A | B | A | X | X | F | T | X | − |
| B | B | A | B | A | X | X | T | F | X | + |

| Prev. I/P bit D(n − 2) | Prev. I/P bit D(n − 1) | Current I/P bit D(n) | Last O/P polarity | RDS(n) = min. | RDS(n) < PV | RDS(n) > PV | RDS(n) = max. | Ternary O/P (n + 1) |
|---|---|---|---|---|---|---|---|---|
| X | X | A | X | X | X | X | X | 0 |
| A | A | B | X | X | F | T | X | − |
| A | A | B | X | X | T | F | X | + |
| B | A | B | − | F | X | X | F | + |
| B | A | B | + | F | X | X | F | − |
| X | A | B | + | X | F | F | X | − |
| X | A | B | − | X | F | F | X | + |
| X | B | B | + | F | X | X | F | + |
| X | B | B | − | F | X | X | F | − |
| X | X | B | X | F | X | X | T | − |
| X | X | B | X | T | X | X | F | + | wherein D(n) represents a binary digit which is currently being received, D(n−1) represents an immediately preceding digit, D(n−2) represents a digit immediately preceding digit D(n−1), PV represents a predetermined value, X indicates a "don't care" condition, A represents a first binary value, B represents a second binary value, F represents a state in which a condition is false, T represents a state in which that condition is true, and RDS signifies running digital sum of ternary symbols already produced, said encoding assuring that the RDS remains within predetermined thresholds to restrict said d.c. imbalance on said communication channel.

9. A method of encoding binary data for communication over a communication channel to assure that a running digital sum of encoded binary data remains within predetermined thresholds to restrict any d.c. imbalance on said communication channel, wherein successive binary digits are encoded as one of three signal levels in accordance with the following truth table:

| Prev. I/P bit D(n − 1) | Current I/P bit D(n) | Last O/P polarity | RDS(n) = min. | RDS(n) < PV | RDS(n) > PV | RDS(n) = max. | Ternary O/P (n + 1) |
|---|---|---|---|---|---|---|---|
| X | A | X | X | X | X | X | 0 |
| A | B | X | X | F | T | X | − |
| A | B | X | X | T | F | X | + |
| A | B | + | X | F | F | X | − |
| A | B | − | X | F | F | X | + |
| B | B | + | F | X | X | F | + |
| B | B | X | F | X | X | T | − |
| B | B | − | F | X | X | F | − |
| B | B | X | T | X | X | F | + | wherein D(n) represents a binary digit which is currently being received, D(n−1) represents an immediately preceding digit, PV represents a predetermined value, X indicates a "don't care" condition, A represents a first binary value, B represents a second binary value, F represents a state in which a condition is false, T represents a state in which that condition is true, and RDS signifies running digital sum of ternary symbols already produced, said encoding assuring that the RDS remains within predetermined thresholds to restrict said d.c. imbalance on said communication channel.

10. A coder for encoding binary data for communication over a communication channel such that successive binary digits having first or second binary values are encoded as one of three signal levels, said coder further controlling said encoding to assure that a running digital sum of said signal levels remains within predetermined thresholds to restrict any d.c. imbalance on said communication channel, said coder comprising:

first selection means for selecting a first predetermined signal level to represent a binary digit if that digit has a first binary value; and
second selection means for selecting one of second and third predetermined signal levels to represent a binary digit if that digit has a second binary value, said first signal level being intermediate in value between said second and third signal levels, said second and third signal levels being of opposite polarity to one another, said second selection means having:
means for maintaining a cumulative sum of signal levels already selected;
means for selecting said second signal level if said cumulative sum has attained a first predetermined threshold;
means for selecting said third signal level if said cumulative sum has attained a second predetermined threshold different from said first predetermined threshold;
means for selecting whichever of said second and third signal levels is not the one of those signals most recently selected, if said cumulative sum does not satisfy a predetermined criterion and said first predetermined signal level has been selected at least once since selection of either said second or said third signal level;
means for selecting whichever of said second and third signals will change said cumulative sum towards a predetermined value, if said cumulative sum does satisfy said predetermined criterion and said first predetermined signal level has been selected at least once since selection of either said second or said third signal level; and
means for selecting otherwise whichever of said second and third signal levels is the same as the one of those signals most recently selected.

11. A coder for encoding binary data for communication over a communication channel, said coder further controlling said encoding to assure that a running digital sum of said signal levels remains within predetermined thresholds to restrict any d.c. imbalance on said communication channel, said coder comprising means for encoding successive binary digits as one of three signal levels in accordance with the following truth table:

| Prev. I/P bit $D(n-2)$ | Prev. I/P bit $D(n-1)$ | Current I/P bit $D(n)$ | Next I/P bit $D(n+1)$ | Last O/P polarity | $RDS(n) =$ min. | $RDS(n) <$ PV | $RDS(n) >$ PV | $RDS(n) =$ max. | Ternary O/P $(n+1)$ |
|---|---|---|---|---|---|---|---|---|---|
| X | X | A | X | X | X | X | X | X | 0 |
| X | A | B | B | X | X | F | T | X | − |
| A | A | B | X | X | X | F | T | X | − |
| A | A | B | X | X | X | T | F | X | + |
| B | A | B | A | − | F | X | X | F | + |
| B | A | B | A | + | F | X | X | F | − |
| X | A | B | B | X | X | T | F | X | + |
| X | A | B | X | + | X | F | F | X | − |
| X | A | B | X | − | X | F | F | X | + |
| X | B | B | X | + | F | X | X | F | + |
| X | B | B | X | − | F | X | X | F | − |
| X | X | B | X | X | F | X | X | T | − |
| X | X | B | X | X | T | X | X | F | + | wherein $D(n)$ represents a binary digit which is currently being received, $D(n-1)$ represents an immediately preceding digit, $D(n-2)$ represents a digit immediately preceding digit $D(n-1)$, $D(n+1)$ represents a digit to follow the one currently being received, PV represents a predetermined value, X indicates a "don't care" condition, A represents a first binary value, B represents a second binary value, F represents a state in which a condition is false, T represents a state in which that condition is true, and RDS signifies running digital sum of ternary symbols already produced.

* * * * *